(12) United States Patent
Jacobs et al.

(10) Patent No.: US 7,404,415 B2
(45) Date of Patent: Jul. 29, 2008

(54) MECHANICAL INTERMITTENT TIMER FLOW CONTROLLER

(75) Inventors: Scott W. Jacobs, Peoria, IL (US); Lawrence P. Heren, East Peoria, IL (US); John D. Wisslead, East Peoria, IL (US); David P. Ransburg, Peoria, IL (US)

(73) Assignee: L.R. Nelson Corporation, Peoria, IL (US)

( * ) Notice: Subject to any disclaimer, the term of this patent is extended or adjusted under 35 U.S.C. 154(b) by 569 days.

(21) Appl. No.: 11/039,527

(22) Filed: Jan. 19, 2005

(65) Prior Publication Data

US 2006/0157125 A1    Jul. 20, 2006

(51) Int. Cl.
*F16K 31/48* (2006.01)
(52) U.S. Cl. .............................. 137/624.11; 137/624.18
(58) Field of Classification Search ............ 137/624.11, 137/624.13, 624.18
See application file for complete search history.

(56) References Cited

U.S. PATENT DOCUMENTS

| | | | |
|---|---|---|---|
| 3,547,154 A | 12/1970 | Benham | |
| 3,578,245 A | 5/1971 | Brock | |
| 3,912,167 A | 10/1975 | Simon | |
| 4,003,402 A | 1/1977 | Corliss et al. | |
| 4,130,135 A | 12/1978 | Moore | |
| 4,153,380 A | 5/1979 | Hartman | |
| 4,156,396 A | 5/1979 | Konucik | |
| 4,270,574 A | 6/1981 | Graber | |
| 4,351,360 A | 9/1982 | Smyth | |
| 4,526,198 A | 7/1985 | Scott | |
| 4,562,865 A | 1/1986 | Lemkin et al. | |
| 4,633,905 A | 1/1987 | Wang | |
| 4,708,264 A * | 11/1987 | Bruninga | ............... 137/624.18 |
| 4,866,880 A | 9/1989 | Weinblatt | |
| 6,243,986 B1 | 6/2001 | Crowley | |
| 6,732,947 B2 | 5/2004 | McKenna | |
| 6,986,364 B1 * | 1/2006 | Wang | ..................... 137/624.11 |
| 7,117,893 B1 * | 10/2006 | Krupa | .................... 137/624.11 |

* cited by examiner

*Primary Examiner*—Kevin L Lee
(74) *Attorney, Agent, or Firm*—Brinks Hofer Gilson & Lione

(57) ABSTRACT

An intermittent fluid flow controller including a main body that houses an inlet in controlled fluid communication with an outlet, a mechanical timing mechanism including a rotatable member that rotates during an operation of the timing mechanism, and a first valve operated by the rotatable member. The first valve is disposed in the main body such that a rotational movement of the rotatable member actuates the first valve to intermittently permit and restrict a fluid flow between the inlet and the outlet over a pre-selected period of time determined by the operation of the timing mechanism.

23 Claims, 9 Drawing Sheets

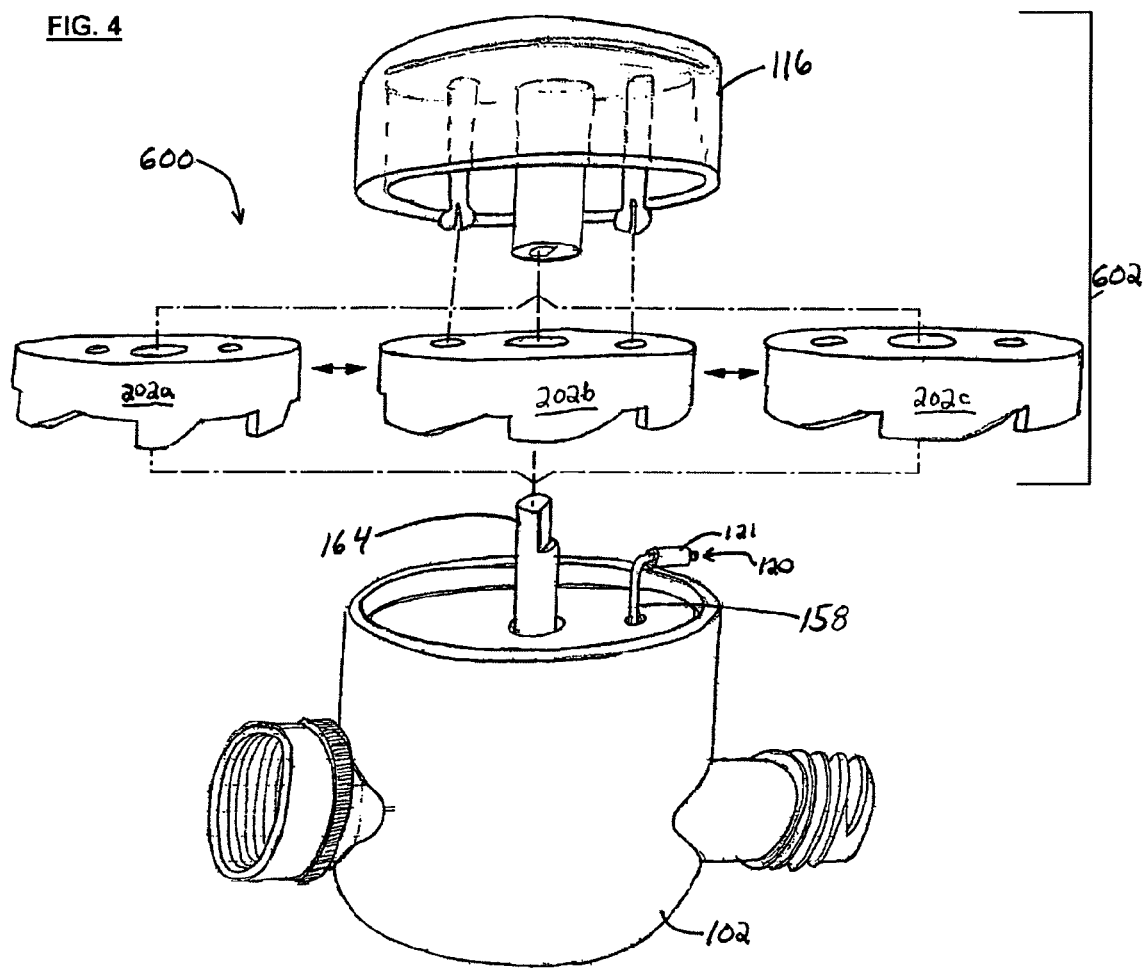

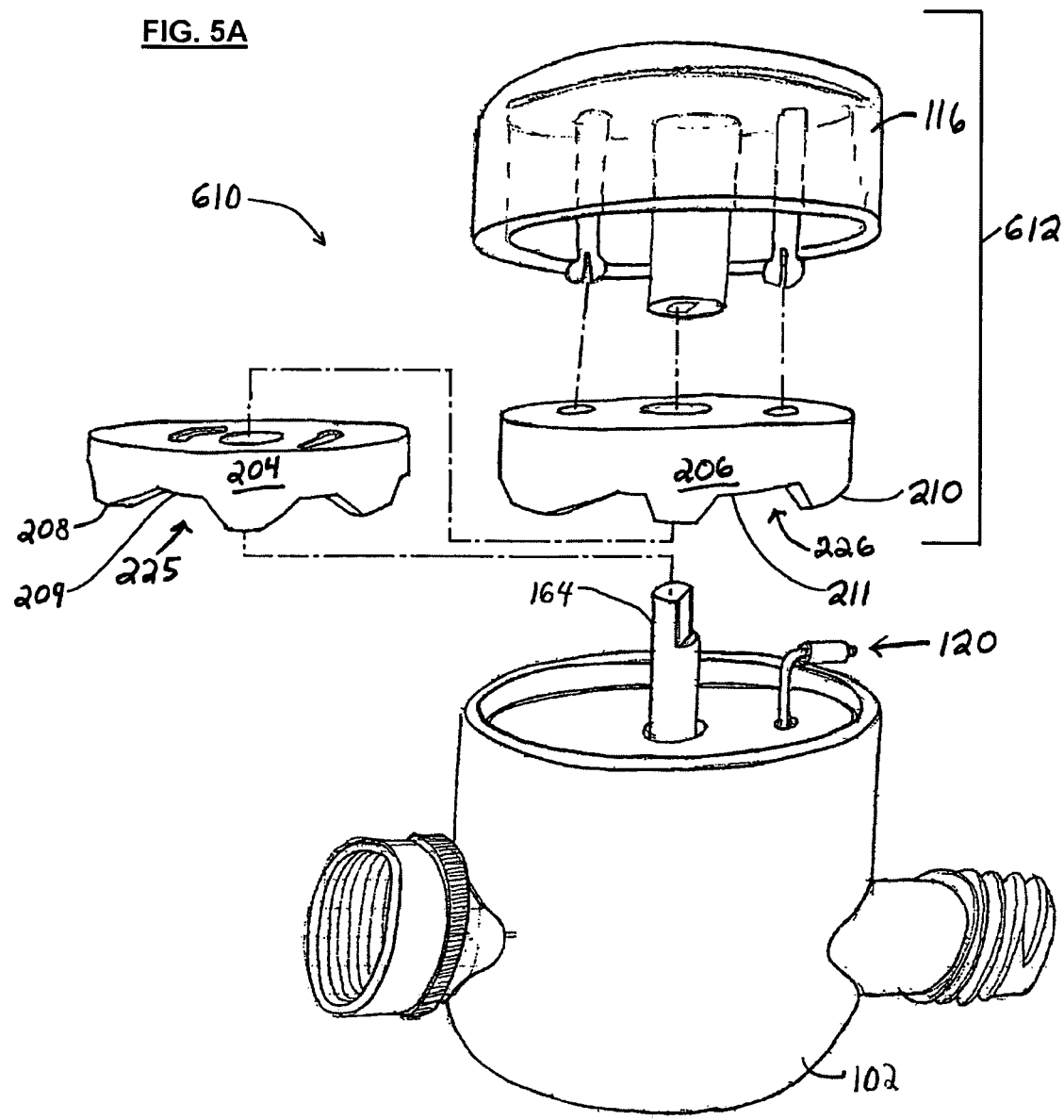

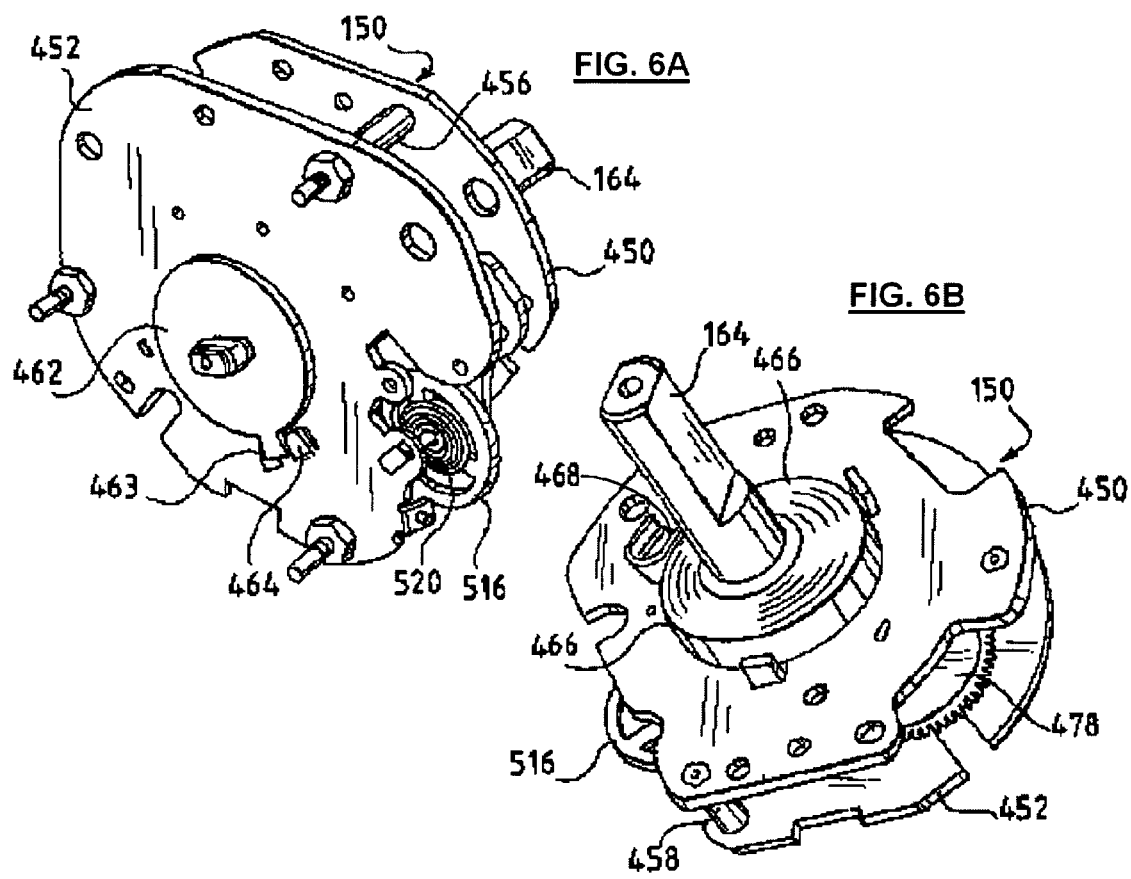

MECHANICAL INTERMITTENT TIMER FLOW CONTROLLER

FIELD OF INVENTION

The present invention relates generally to the field of water valve timers. More specifically, the present invention is directed to a mechanical intermittent timer flow controller which provides for intermittent on/off cycles during an irrigation application.

BACKGROUND OF INVENTION

There is a recognized need for timer valve assemblies that permit flow of water for certain periods of time. The current examples of such valves typically include a timer, a water inlet and an outlet. A water source, such as a spigot, is connected to the inlet while a hose or other watering device is coupled to the outlet. The valve assembly is controlled by a timing device which will open the valve and keep it open to allow water flow to the outlet. In such a manner, a user simply sets the timer for a pre-determined period of time. The user does not need to return to the valve assembly to shut off the water flow to prevent over-watering.

Various timer mechanisms have been used in the past. For example, an electronic timer has been used. Electronic timers may be analog or digital and may also use electrical power to actuate the on-off valve. Such timers are very accurate, but suffer from several shortcomings. If the electrical power is supplied by a battery, the timer has a limited life. Further, the timer must be constructed to protect the battery from outside elements, thereby increasing the weight of the device and the number of component parts. Alternatively, the electrical power may be supplied through a standard electrical outlet. However, this limits the effective range of the valve as it must be placed in proximity to an electrical outlet in order to function. Also, electrical devices cause some safety concerns due to a risk of electric shock and moisture-related "shorting."

Another type of timer which has been used is a water-driven mechanical timer. One example of such a timer includes an impeller interposed between the inlet and the outlet of the valve. The impeller is rotated by the water flow. A gearing system is coupled to the impeller to activate the valve after some time period to stop the water flow. The impeller-based timer is self-running and thus does not require an independent power source. However, this type of timer suffers from inaccuracy because the rotational speed of the impeller depends entirely on the rate of water flow which may not be constant from source to source. In addition, if the water flow is of a sufficiently low pressure, the valve may not shut off.

A variety of valve assemblies have used mechanical wind-up timers. These timers typically operate using a spring which is wound up and gradually released such that the valve closes and shuts off water flow when the timer has run out. However, because such timers have a timing mechanism that does not directly couple to the valve assembly, additional torque must be generated by the spring to activate a separate mechanism to open and/or close the valve assembly, and thus the valve assembly is not as efficient. The complexity and size required of the mechanisms in many such prior art designs increase the manufacturing costs.

For certain soil and vegetation types, it is advantageous to water in intermittent increments over a pre-determined length of time. Such a watering scheme can serve to prevent short-term saturation and excess watering by limiting both the timing of a on/off watering cycle and the total length of watering time (e.g., water on for five minutes then off for ten minutes, over a three hour period). It can also help to conserve water by allowing a finite overall watering period and by allowing water from an "on cycle" to be absorbed during an intermittent "off cycle" rather than accumulating on a watering surface where it is more likely to be lost to evaporation and/or runoff. Some complex mechanical timer/valve designs and some electronic timer/valve designs have been used in an attempt to address this need. However, current wholly mechanical (i.e. non-electrical) timer valves do not presently offer an efficient design for intermittent timed watering over a set watering time, and the available electronic intermittent timers suffer from the disadvantages discussed above.

Thus, there is a need for a mechanical timer in which the mechanical components are coupled with the valve assembly to conserve space while providing increased mechanical efficiency. There is a further need for a mechanical timer which is accurate but requires no outside power source. There is also a need for a mechanical timer that includes a less complex assembly and which provides an accurate, efficient intermittent watering feature throughout a pre-determined watering cycle time.

SUMMARY OF THE INVENTION

These needs and others are addressed in embodiments of the present invention, one example of which is a timer-controlled intermittent flow controller for controlling the flow of water.

In one aspect, the present invention is related to a water flow controller for an intermittent watering operation including an inlet in controlled fluid communication with an outlet and a mechanical timing mechanism with a rotatable shaft operably contacting a rotatable cam member such that a rotating of one of the shaft and the cam member translates to rotating of the other. The flow controller also includes a first valve operably connected to the rotatable cam member such that a rotational movement of the cam member actuates the valve to intermittently permit and restrict a water flow between the inlet and the outlet over a pre-selected period of time. The valve may be located along or parallel to a central axis of the water flow controller.

In another aspect, the present invention relates to an intermittent fluid flow controller that includes a main body with an inlet in controlled fluid communication with an outlet and a mechanical timing mechanism including a rotatable member that rotates during an operation of the timing mechanism. The flow controller also includes a first valve operated by the rotatable member and disposed in the main body such that a rotational movement of the rotatable member actuates the first valve to intermittently permit and restrict a fluid flow between the inlet and the outlet over a pre-selected period of time determined by the operation of the timing mechanism.

It is to be understood that both the foregoing brief description and the following detailed description are not limiting but are intended to provide further explanation of the invention claimed. The accompanying drawings, which are incorporated in and constitute part of this specification, are included to illustrate and provide a further understanding of the method and system of the invention.

BRIEF DESCRIPTION OF DRAWINGS

Various aspects and advantages of the invention will be discussed more in detail hereinafter with reference to the disclosure of sample embodiments, and in particular with reference to the appended Figures wherein:

FIG. 4 illustrates a partially exploded view of one alternative embodiment of a mechanical timer flow controller of the present invention;

FIG. 5A presents a partially exploded view of another alternative embodiment of a mechanical timer flow controller of the present invention;

FIG. 6A is a front perspective view of a sample timing mechanism of the mechanical timer valve in FIG. 1;

FIG. 6B is a rear perspective view of the sample timing mechanism of the mechanical timer valve in FIG. 1;

DETAILED DESCRIPTION

Figure 1:
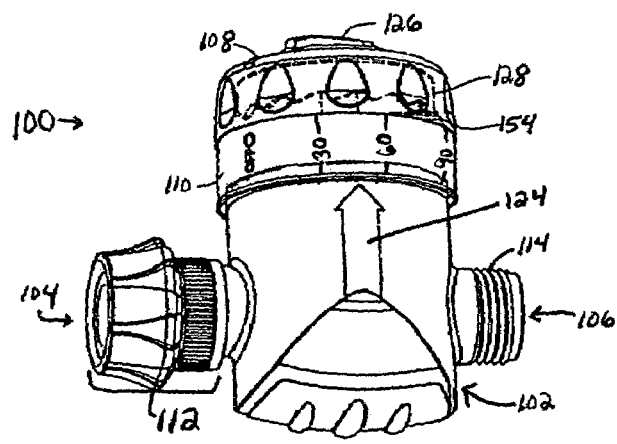
FIG. 1 is a perspective view of a mechanical timer flow controller according to one embodiment of the present invention.

While the present invention is capable of embodiment in various forms, there is shown in the drawings and will hereinafter be described sample embodiments of an intermittent water flow controller with the understanding that the present disclosure is to be considered as an exemplification of the invention, and is not intended to limit the invention to the specific embodiments illustrated.

Figure 2:
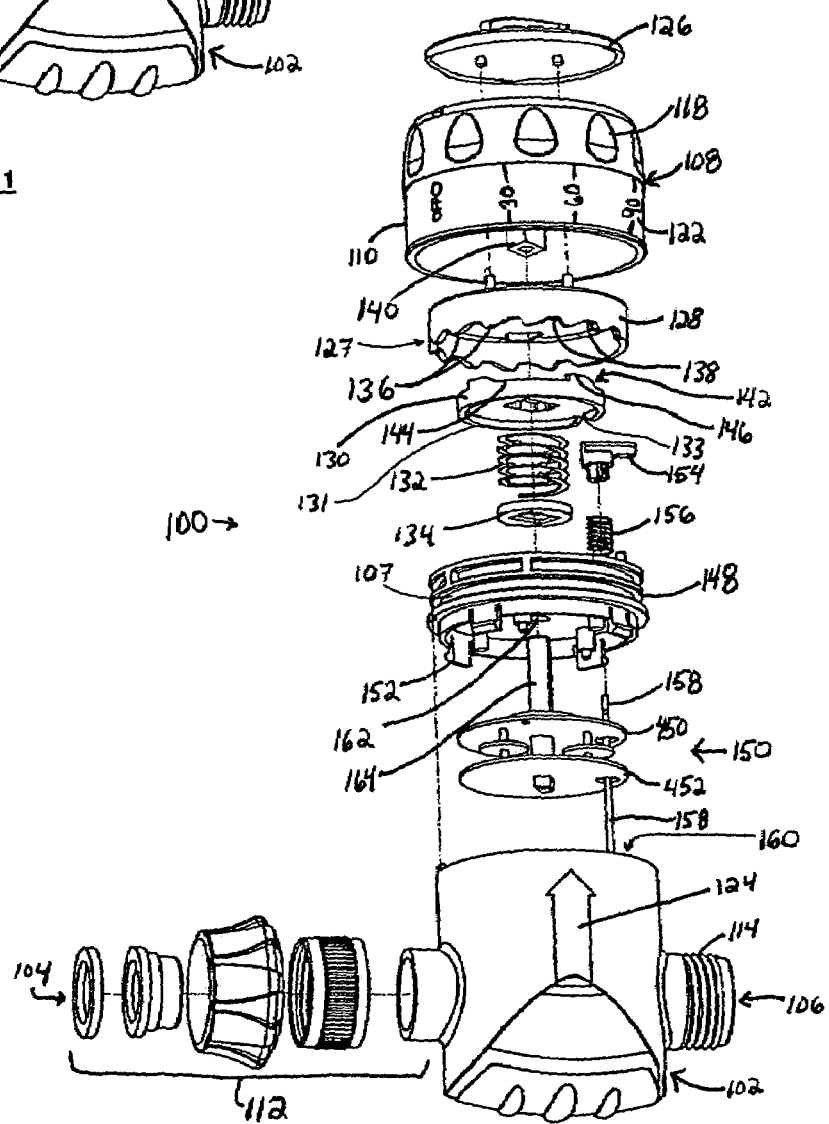
FIG. 2 shows an exploded view of the components of the mechanical timer flow controller of FIG. 1.
Figure 3A:
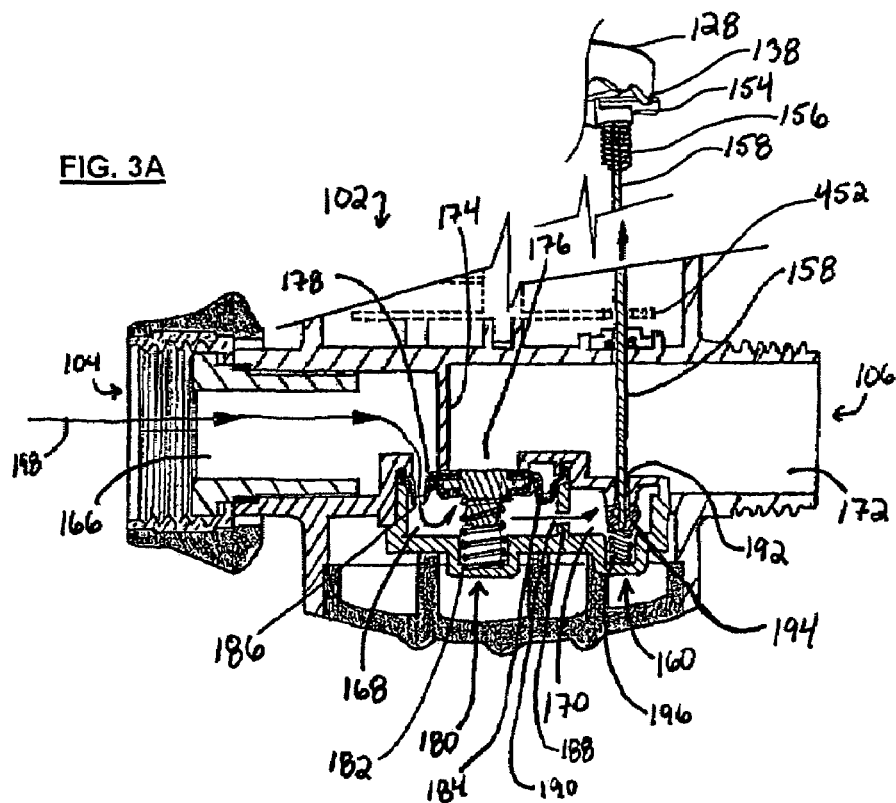
FIG. 3A is a cross-sectional view of the mechanical timer flow controller body in a "closed" configuration.
Figure 3B:
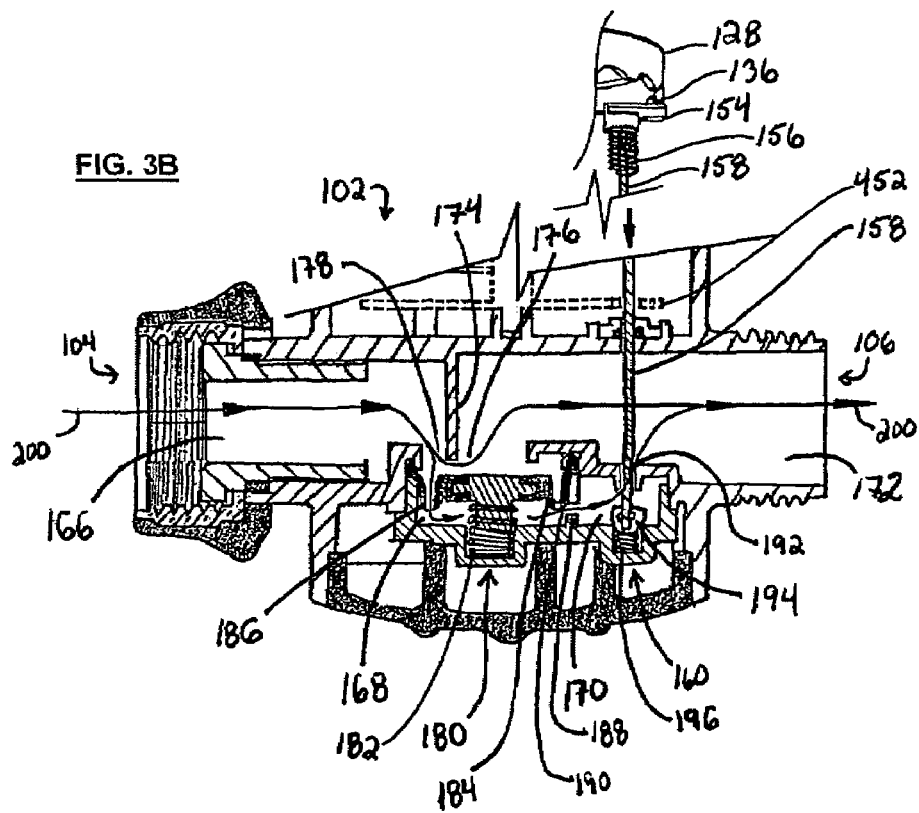
FIG. 3B is a cross-sectional view of the mechanical timer flow controller body in an "open" configuration.
Figure 6C:
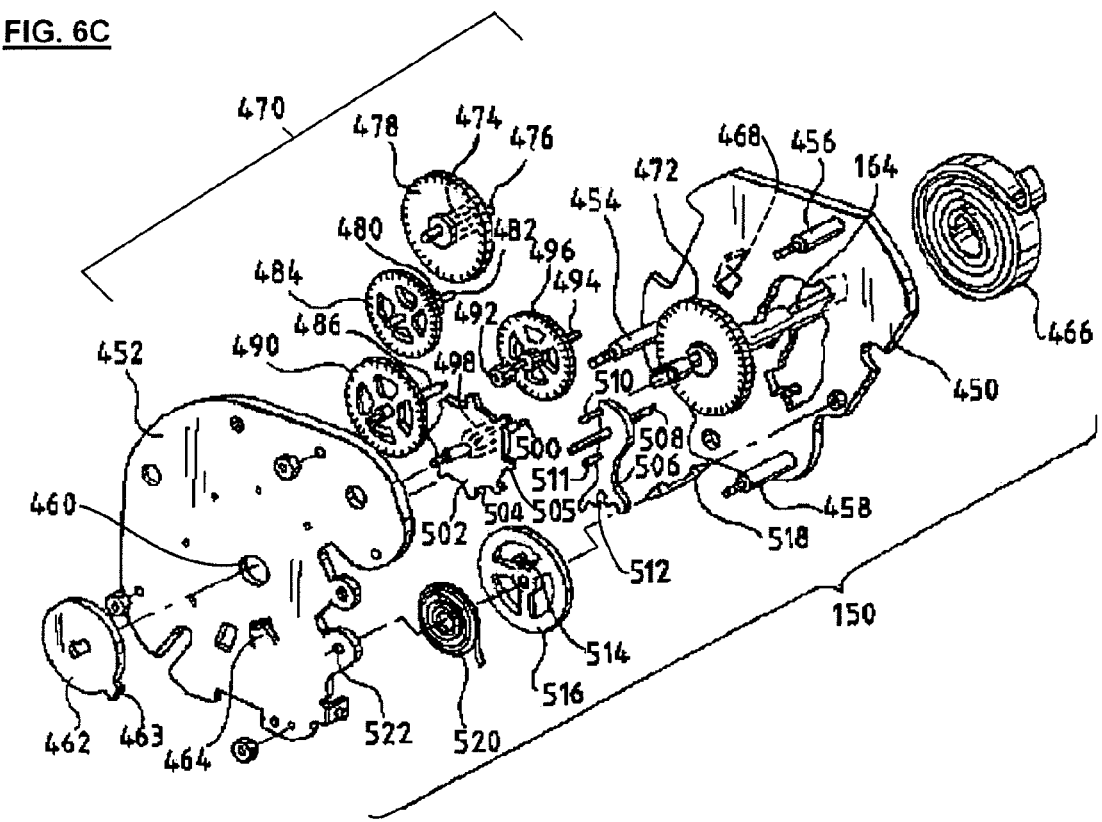
FIG. 6C is an exploded view of the parts of the sample timing mechanism in FIGS. 6A and 6B.

FIG. 1 is a perspective view of a mechanical intermittent timing flow controller 100 of the present invention. FIG. 2 shows an exploded view of one embodiment of the mechanical intermittent timing flow controller 100. The mechanical timing flow controller 100 includes a main body 102 which includes a water inlet 104 and a water outlet 106. The flow controller also includes a dial knob 108, which includes an indicator collar 110. The internal components and structure of the body 102 are illustrated in FIGS. 3A-3B as described below. The internal structures and components of a sample timing mechanism embodiment 150 are illustrated in FIGS. 6A-6C below. The water inlet 104 includes a hose coupler 112, for attachment to a standard hose bib or sill cock connector. The water outlet 106 includes a male coupling member 114, which includes a threaded exterior for coupling to a hose or other complementarily threaded device. In other embodiments, other types of hose connectors may be used for one or both of the inlet 104 and the outlet 106 such as, for example, a quick-connect type of connector.

When the flow controller 100 is assembled, the dial knob 108 is installed on the top of the body 102. The dial knob 108 includes a gripping surface 118 with indentations to facilitate gripping and turning the knob 108. In the illustrated embodiment, the indicator collar 110 includes a series of time-marking indicia 122 printed in 30-minute increments for aligning with an indicator 124 located on the surface of the body 102. A user may turn the dial knob 108, aligning a desired time marking indicia 122 with the indicator 124 to set the length of time that the flow controller 100 will remain in operation. The illustrated embodiment of the flow controller 100 allows for a continuous time setting or an intermittent time setting. In the flow controller 100 as shown, the desired time may be selected for continuous watering for up to three hours, or the user may select an intermittent on-off setting wherein, for example, the water is on for five minutes, then off for fifteen minutes over a time period of up to three hours. Those of skill in the art will appreciate that mechanisms for other time periods and other intermittency patterns are possible and within the scope of the present invention. Additionally, other time-setting indicia may be used in other embodiments. For example, the time marking indicia may be marked in different time increments and/or marked on the body 102, while the indicator could be placed on the dial knob 108.

A body cap 148 of the flow controller 100 mounts to the body 102 with tabs 152 that engage inner notches (not shown) for the body 102. The dial knob 108 is rotatably attached to the body cap 148 by pins (not shown) through the indicator collar 110 that slidingly engage a groove 107 in the body cap 148. Thus, when the flow controller 100 is assembled, the indicator collar 110 surrounds the body cap 148 and slightly overlaps the upper edge of the body 102.

The dial knob 108 houses an assembly that includes a partially rotatable top cap 126, a wave-toothed cam member 128, a lock-on plate 130, a coil spring 132, and a spring retainer 134. The wave-toothed surface 127 of the cam member 128 includes crests 136 and troughs 138 (the "wave-toothed" surface is a somewhat rounded adaptation of a crenellated surface wherein the crests correspond to teeth or merlons and the troughs correspond to interdental gaps or crenels). The dial knob 108 includes a mounting core 140 around which the cam member 128, the lock-on plate 130, and the coil spring 132 are slidingly disposed. The spring retainer 134 is fixedly mounted to the mounting core 140 and serves to retain the cam member 128, the lock-on plate 130, and the coil spring 132 in the dial knob 108. The coil spring 132 is disposed between the fixed spring retainer 134 and the lock-on plate 130 so as to bias the lock-on plate 130 against the cam member 128.

The cam member 128 is attached to the top cap 126 and can be rotated between a first and second position relative to the lock-on plate 130 by twisting the top cap 126 relative to the dial knob 108. The first and second positions correspond, respectively, to an intermittent timing configuration and a "timed on" configuration. The top of the lock-on plate 130 has a crenellated rim 142 including low edges 144 and high edges 146. The lower inside surface of the cam member 128 includes protrusions (not shown) that, in the first position, abut the low edges 144, allowing the lock-on plate 130 to move closer to the cam member 128. In the second position, the protrusions (not shown) abut the high edges 146, pushing the lock-on plate 130 against the bias of the coil spring 132, and farther away from the cam member 128.

A cam follower 154 is mounted on an optional cam follower coil spring 156 above the body cap 148. The cam follower 154 is sized, shaped, and positioned to engage the wave-toothed surface 127 of the cam member 128 and/or the lower surface of the lock-on plate 130. When the lock-on plate 130 is in the second position, a lower surface portion of the lock-on plate 130 pushes the cam follower 154 against the biasing force of the cam follower coil spring 156 into a "down/open position." When the top cap 126 and the lock-on plate 130 are in this second position, the flow controller 100 operates continuously without intermittent "off periods" for the amount of time the user selects. In some alternative embodiments, this "timed on" feature may be absent. The portion of the cam follower 154 engaged with the wave-toothed surface 127 of the cam member 128 forces the cam follower 154 into the down position when engaged with a crest 136, and allows the cam follower 154 to move into an "up/closed position" when engaged with a trough 138.

The "down/open" and "up/closed positions of the cam follower 154 correspond to the interaction of the cam follower 154 with a stem valve 160. The cam follower 154 is mounted on a plunger stem 158 of the stem valve 160, around which the cam follower coil spring 156 is mounted. Up and down movement of the cam follower 154 in response to its engagement with the one or both of the wave toothed surface 127 of the cam member 128 and the lock-on place 130 translates directly into up and down movement of the plunger stem 158 of the stem valve 160. The function of the stem valve 160 as it relates to the open/on and closed/off configurations of the flow controller 100 is explained in greater detail below with reference to FIGS. 3A-3B.

The body cap 148 includes a central aperture 162 through which the drive shaft 164 of a timing mechanism 150 extends to engage the mounting core 140 of the dial knob 108. The body cap 148 also includes an offset aperture (not shown) through which the plunger stem 158 extends to engage the cam follower 154. The timing mechanism 150 is a spring-driven wind-up timer of a type known in the art, and can be a different type of timer in alternative embodiments. While the upper and lower plates 450, 452 of the timer are shown by way of orienting the components of the flow controller 100 in FIG. 2, an example of a timing mechanism 150 used in the flow controller 100 is illustrated in more detail in FIGS. 6A-6C. The engagement of the timer drive shaft 164 with the mounting core 140 allows the dial knob 108 to be used to wind up the timer 150.

The internal features of the body 102 are illustrated in FIGS. 3A-3B. The position of the timer 150 relative to the other internal components of the body 102 is indicated in FIGS. 3A-3B by showing in phantom lines a lower plate 452 of the timer. The following description of operation of the flow controller 100 assumes a flow of distally directed, pressurized water through the inlet 104 into an inlet lumen 166 from, for example, a spigot. FIG. 3A shows a longitudinal cross-sectional view of the body 102 of the flow controller 100 in a closed configuration (i.e., with the cam follower 154 and the stem 158 in an "up" position as described above and not allowing water passage from the inlet 104 to the outlet 106). The body 102 of the flow controller 100 includes the proximal inlet lumen 166, a first valve chamber 168, a second valve chamber 170, and a distal outlet lumen 172. The inlet lumen 166 is divided from the outlet lumen 172 by a dividing wall 174. A proximal aperture 178 provides for fluid communication between the inlet lumen 166 and the first valve chamber 168. An intermediate aperture 176 is disposed between the first valve chamber 168 and the outlet lumen 172. The intermediate aperture 176 is in controlled fluid communication with the proximal aperture 178.

As shown in FIG. 3A, when the flow controller 100 is in a closed configuration, a diaphragm valve 180 in the first valve chamber 168 is biased sealingly against the dividing wall 174 by a coil spring 182. In this "valve closed" configuration, when the diaphragm valve 180 is biased sealingly against the wall 174, it seals the intermediate aperture 176 and the proximal aperture 178 from fluid communication with each other. A resilient diaphragm 184 of the diaphragm valve 180 separates the inlet lumen 166 and the outlet lumen 172 from the first valve chamber 168. A portion of the diaphragm 184 that is disposed just below the proximal aperture 178 substantially separates the first valve chamber 168 from the inlet lumen 166. This portion of the diaphragm 184 includes two small holes 186 in it, permitting fluid communication from the inlet lumen 166 through the proximal aperture 178 into the first valve chamber. Specifically, a limited flow of water from the inlet lumen 166 may pass through the proximal aperture 178 and the holes 186 of the diaphragm 184 into the first valve chamber 168. Optionally, a channel (not shown) from the inlet lumen 166 to the first valve chamber 168 may provide fluid communication therebetween instead of, or in addition to the fluid communication provided by the holes 186 in the diaphragm 184.

A valve chamber divider 188 separates the first valve chamber 168 from the second valve chamber 170. The divider 188 includes a port 190 that allows fluid communication between the first valve chamber 168 and the second valve chamber 170. Optionally, the first and second valve chambers may be embodied in a single valve chamber.

A distal aperture 192 extends between the second valve chamber 170 and the outlet lumen 172. When the flow controller 100 is in a closed configuration, the head 194 of the stem valve 160 in the second valve chamber 170 is biased sealingly against the distal aperture 192 by a coil spring 196 such that water in the second valve chamber 170 is substantially prevented from flowing through the distal aperture 192 into the outlet lumen 172. The plunger stem 158 of the stem valve 160 extends through the outlet lumen 172 and up through the body cap 148 into the cam follower 154 as described above.

As shown in FIG. 3A, when the flow controller 100 is in a closed configuration that prevents water flow from complete passage therethrough, the cam follower 154 is engaged with a trough 138 of the wave-toothed cam member 128 such that the cam follower 154 and the stem 158 are in an "up" position. As described above, in this configuration, the head 194 of the stem valve 160 is sealingly biased against the distal aperture 192 by its coil spring 196 and the diaphragm valve 180 is sealingly biased against the dividing wall 174. This closed configuration of the flow controller 100 prevents water from the proximal inlet 104 from flowing to and through the distal outlet 106. Thus, in this configuration, water from the inlet lumen 166 passes only through the aperture 178 and through the diaphragm holes 186 into the first valve chamber 168. Until the first and second valve chambers 168, 170 are substantially filled, the water flow continues through the port 190 of the divider 188 into the second valve chamber 170. When the first valve chamber 168 and the second valve chamber 170 are filled with water, the resulting static hydraulic pressure in the first valve chamber 168 supplements the biasing force of the coil spring 182, holding the diaphragm valve 180 sealingly against the dividing wall 174, thereby substantially sealing the proximal and intermediate apertures 176, 178. The space occupied by water when the flow controller 100 is in a closed configuration is indicated by an arrow-line 198.

As shown in FIG. 3B, the flow controller 100 is in an open configuration when the cam follower 154 is in an "down" position and is engaged with a crest 136 of the wave-toothed cam member 128. In this open configuration, the plunger stem 158 of the stem valve 160 is pushed down, and the valve stem head 194 moves down to allow water to pass from the second valve chamber 170 through the distal aperture 192 to the outlet lumen 172. Dynamic hydraulic pressure from the water in the inlet lumen 166 forces down the diaphragm 184, pushing water in the first valve chamber 168 through the port 190 in the divider 188, the second valve chamber 170, out through the distal aperture 192 to the outlet lumen 172, and on out through the outlet 106. At the same time, the resulting decrease in static hydraulic pressure within the first valve chamber 168 allows the dynamic hydraulic pressure from the inlet lumen 166 to push down the diaphragm valve 180 against the biasing force of its coil spring 182. Thus, when the diaphragm valve 180 is in a down/open position, water is free to flow from the inlet lumen 166 through the proximal aperture 178, under the wall 174, through the intermediate aperture 176, then to and through the outlet lumen 172. The flow path of the water when the flow controller 100 is in an open configuration is indicated by arrow-lines 200.

In an intermittent timing operation of the flow controller 100, the timing mechanism 150 rotates the dial knob 108 and the wave-toothed cam member 128 for a user-selected period of time. As the cam member 128 rotates, the cam follower 154 alternately engages crests 136 and troughs 138 providing, respectively, open/on and closed/off configurations of the stem valve 160 and thereby of the entire flow controller 100 as described above. The spacing of the crests 136 and troughs 138 on the wave-toothed cam member 128 (combined with the rate of rotation of the timer shaft 164) determines the periodicity of the intermittent open/on-closed/off cycles of the flow controller 100. For example, a long crest 136 allows for a long dwell time of the stem valve 160 in an open/on position. In the embodiment illustrated in FIGS. 3A-3B, the troughs 138 and crests 136 are sized and spaced to provide for an intermittent cycle of 5 minutes open/on and 15 minutes closed/off. In alternative embodiments, one or both of the open/on and closed/off times may be longer or shorter. The shape of the teeth/waves on the cam member also can be varied in alternative embodiments within the scope of the present invention.

An alternative embodiment of a handle and cam assembly 602 of a flow controller 600 of the present invention is shown in FIG. 4. In this embodiment, a plurality of interchangeable cam members 202a-202c is provided, offering different crennelation patterns on the cam members 202 for different intermittent watering times. An alternative embodiment of a knob handle 116 is shown on the flow controller 500. This knob handle 116 also engages the timer shaft 164 and the cam members 202. In this embodiment, a user selects and installs a cam member 202 that provides a desired intermittent watering pattern. For example, the cam member 202a provides a watering cycle of on for 5 minutes and off for 7 minutes; the cam member 202b provides a watering cycle of on for 10 minutes and off for 4 minutes; and the cam member 202c provides a watering cycle of on for 12 minutes and off for 2 minutes. In a further alternative embodiment, a cam member 202 may have an irregularly crennelated camming surface to confer an irregular intermittent watering cycle (e.g., on for 3 minutes, off for 10 minutes, on for 5 minutes, off for 8 minutes, on for 7 minutes, off for 2 minutes, etc.). In the illustrated embodiment, the cam follower structure 120 is a roller 121 on an angled tip of the stem 158. Any number of irregular cam surface patterns may be used to provide for a desired intermittent timing period.

Figure 5B:
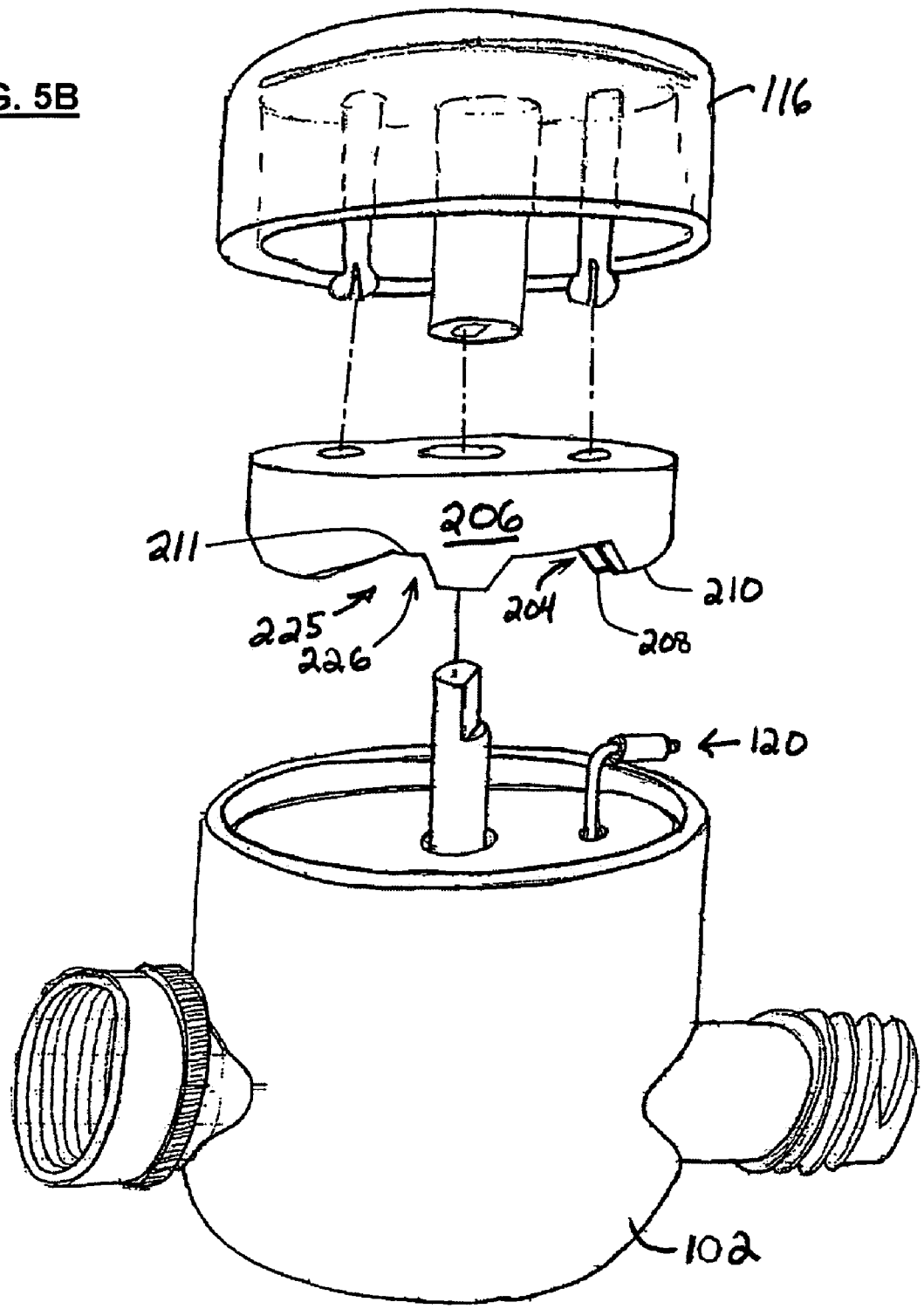
FIG. 5B shows the flow controller embodiment of FIG. 5A assembled, and in a closed configuration.
Figure 5C:
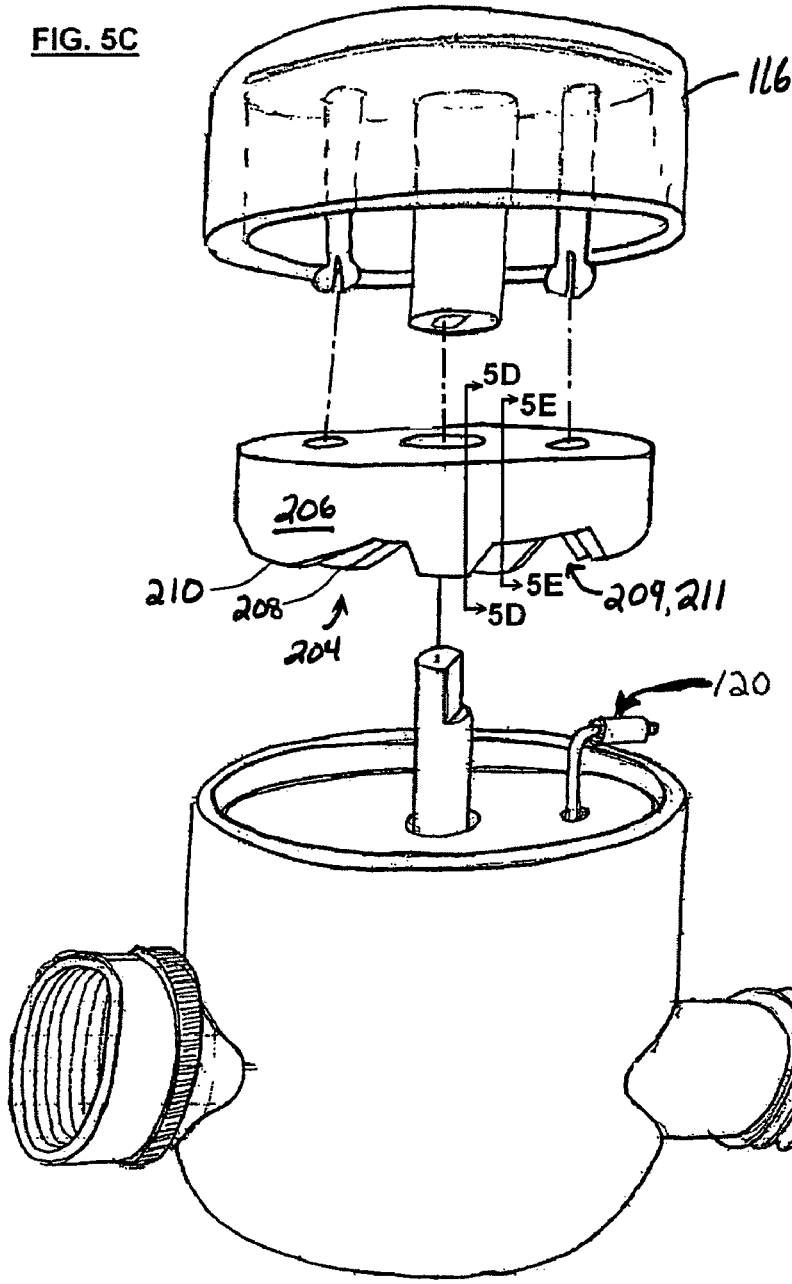
FIG. 5C illustrates the flow controller embodiment of FIG. 5A assembled, and in an open configuration.

In another alternative embodiment, two crennelated cam members 204, 206 are provided as part of a knob handle 116 and cam assembly 612 of a flow controller 610. This embodiment is illustrated in FIGS. 5A-5C. In FIG. 5A, both cam members 204, 206 are shown relative to the knob handle 116 and the body 102 including the cam follower 120 (of the stem valve 160 (not shown, concealed within the body 102)). The inner cam member 204 is rotatably adjustable relative to the outer cam member 206 in which it is nested. The inner cam member 204 includes an inner crenellated surface 225 with teeth 208 and gaps 209 between the teeth 208. The outer cam member 206 includes an outer crenellated surface 226 with teeth 210 and gaps 211 between the teeth 210. The nested position of the inner cam member 204 in the outer cam member 206 is such that the inner crennelated surface 225 is annularly positioned inside the outer crennelated surface 226. In alternative embodiments, the outer cam member 206 may be adjustable relative to the inner cam member 204, or both cam members 204, 206 may be adjustable relative to one another. Other sample embodiments of handle assemblies with adjustable, annularly arranged cams are shown in FIGS. 7 and 8.

Figure 5D:
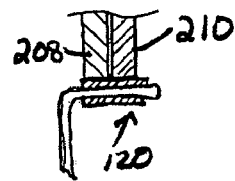
FIG. 5D is a cross-sectional detail view along line 5D-5D of FIG. 5C, presented as the cam members appear when in contact with the cam follower in an assembled flow controller.
Figure 5E:
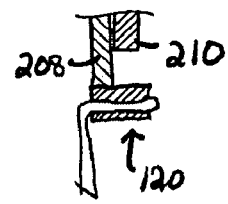
FIG. 5E is a cross-sectional detail view along line 5E-5E of FIG. 5C, presented as the cam members appear when in contact with the cam follower in an assembled flow controller.

Adjusting the inner cam member 204 relative to the outer cam member 206 changes the dwell times in the open/on and closed/off positions of the cam follower 120 and the stem valve 160 by altering the net length of the toothed surface (208 plus 210) and gapped surface (209 plus 211) of the crenellated surface(s) 225, 226 in contact with the cam follower 120. This adjustability provides for the ability to alter the on/off intermittent cycle without changing cam members. Also, by adjusting the cam members 204, 206 relative to each other, a user has a great deal of flexibility in choice of intermittent on/off cycle times. For example, in FIG. 5B, the cam teeth 208 of the inner cam member 204 are aligned substantially directly with the cam teeth 210 of the outer cam member 206 providing an on/off cycle of on for 5 minutes and off for 12 minutes. In FIG. 5C, the cam teeth 208, 210 of the inner and outer cam members 204, 206 are offset to provide an on/off cycle of on for 7 minutes and off for 8 minutes. This change of cycle time results from the cam follower 120 contacting a longer net toothed surface (208 plus 210) and a shorter net gapped surface (209 plus 211). FIG. 5D is a cross-sectional detail along line 5D-5D in FIG. 5C, and illustrates (as being engaged with the cam follower 120) the relative position of the cam teeth 208, 210 at a point where they fully overlap. FIG. 5E is a cross-sectional detail along line 5E-5E in FIG. 5C, and illustrates the relative position of a cam tooth 208 (as being engaged with the cam follower 120) when only the inner cam member 204 is engaged with the cam follower 120 and holding it in the down/open position. In a further embodiment, more than two cam members can be provided.

In yet a further alternative embodiment, the application of FIGS. 5A-5C may be combined with the embodiment shown in FIG. 4 by providing multiple inner and/or outer cam members that can be arranged in annularly nested fashion to offer users a broad array of intermittent time period choices. In such embodiments, one or both of the outer cam and the inner cam may be interchangeable. In a further alternative embodiment, three or more cam members may be provided. In still another embodiment, the crenellated surface of the cam(s) may interface directly with the stem of the stem valve instead of acting through a cam follower. In yet another embodiment, the cam follower may be a lever with a fulcrum between the cam follower's connection with the stem valve and the cam follower's contact point with the cam(s); in such an embodiment, the on/off cycle relative to cam position could be reversed (with troughs/crenels corresponding to "off" and crests/merlons corresponding to "on"). In yet another alternative embodiment, not shown, the operation of a stem valve may be controlled by up and down movement of a cam member fixedly attached to a single stem valve such as is illustrated in U.S. patent application Ser. No. 10/891,285, which is assigned to L.R. Nelson Corp. of Peoria, Ill., and which is incorporated herein by reference. In such an embodiment, the crennelated surface of cam member could ride over a fixed protrusion, causing the cam member to confer up and down movement to the stem valve. In still another embodiment, not shown, the single valve may be located along or parallel to a central axis of the flow controller.

Figure 7:
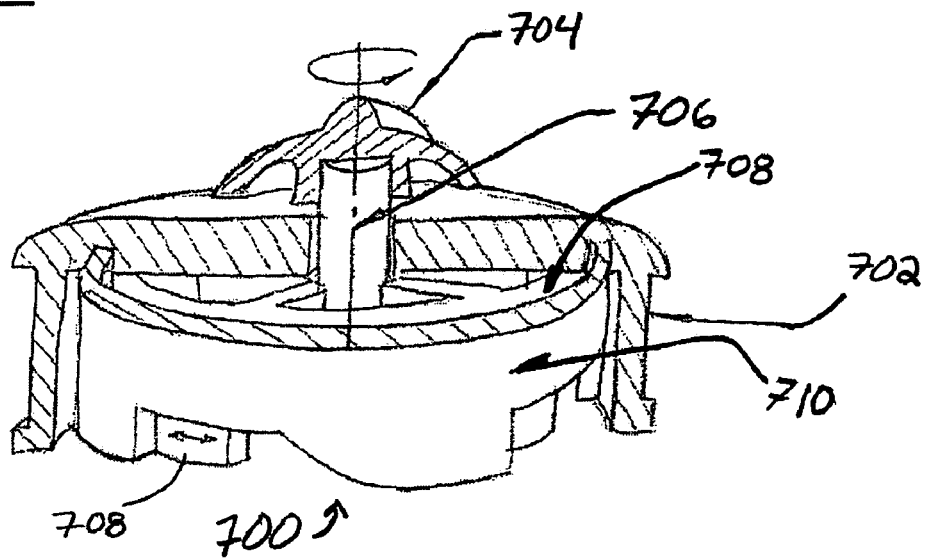
FIG. 7 shows one embodiment of a controller handle assembly.
Figure 8:
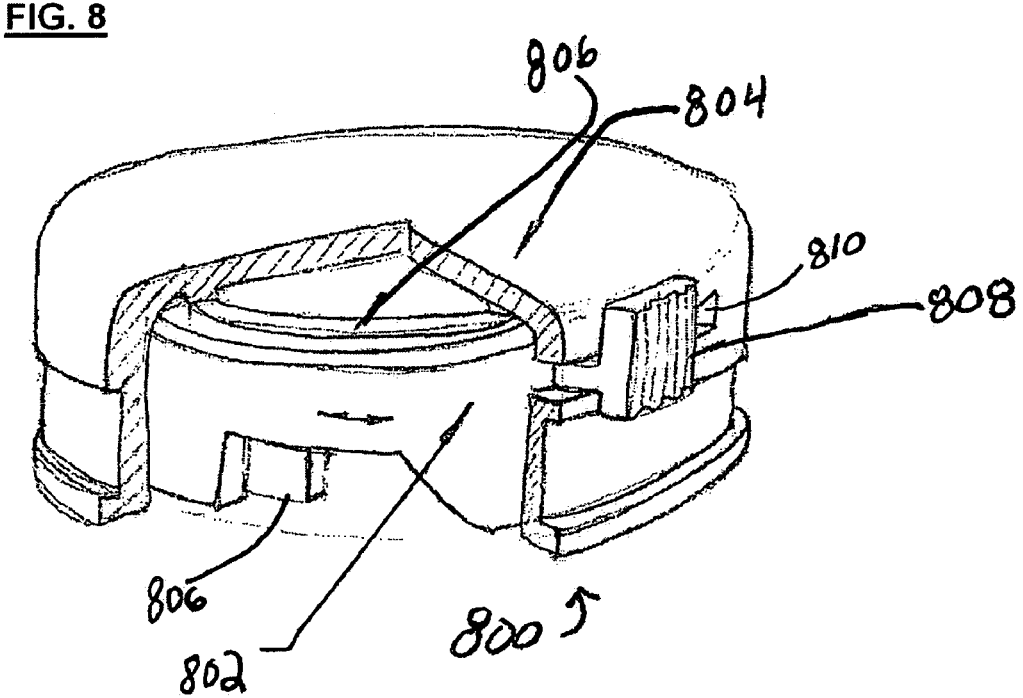
FIG. 8 shows another embodiment of a controller handle assembly.

FIGS. 7 and 8 illustrate two alternative embodiments of handle assemblies for a flow controller, each having annularly arranged cams for adjusting timing of a water flow. FIG. 7 shows a controller handle assembly 700 that includes an outer cap 702 attached to an outer crenellated cam 710, and a top adjusting knob 704 connected by a shaft 706 to an inner rotatable/adjustable crenellated cam 708. The outer cap 702 is fixed to the outer crenellated cam 710, and the inner rotatable/adjustable crenellated cam 708 is rotatable relative to the outer cap and outer crenellated cam 710. A user may alter the relative positions of crenellated camming surfaces of the two cams 708, 710 by twisting the top adjusting knob 704 to rotate the inner rotatable/adjustable crenellated cam 708 relative to the outer crenellated cam 710. Similar to the manner described for the annularly arranged cam members in FIGS. 5A-5E, the change in relative position between the cams 708, 710 will change the interaction of the overall camming surface with a valve of the timer, thereby changing the intermittent period during a timer/flow controller operation. The cam positions in this and other embodiments can be adjusted such that there is never an "off gap" between the open/on positions of the valve such that the flow controller acts as a "timed on" valve assembly that remains in an open/on position for the user-selected time, without closing/turning off intermittently.

FIG. 8 shows a controller knob assembly 800 with an adjustable outer crenellated cam 802. The controller knob assembly 800 includes an outer cap 804 that is fixedly attached to an inner crenellated cam member 806. The adjustable outer crenellated cam member 806 is rotatable relative to the outer cap 804 and inner crenellated cam member 806. An adjustment tab 808 is attached to the adjustable outer crenellated cam 802 and extends through a slot 810 in the outer cap 804. A user can adjust the adjustable outer crenellated cam 802 to alter the relative position of its teeth/gaps relative to the teeth/gaps of the inner crenellated cam member 806. Similar to the manner described for the annularly arranged cam members in FIGS. 5A-5E, the change in relative position between the cams 802, 806 will change the interaction of the overall camming surface with a valve of the timer, thereby changing the intermittent on/off period during a timer/flow controller operation.

FIGS. 6A, 6B, and 6C are views of a timing mechanism 150 which is mounted in the valve body 102. The illustrated timing mechanism 150 includes an escapement. Other embodiments of mechanical timing mechanisms may be used in other embodiments of the present invention. The windup shaft 164 is rotated by rotating the dial knob 108. The timing mechanism 150 includes two opposite upper and lower plates 450, 452 which are fixed in place by pins 454, 456 and 458. The windup shaft 164 is seated in a socket 460 which is on the lower plate 452. A washer 462 is attached to the end of the windup shaft 164 and includes a protruding tab 463. The washer 462 rotates with the windup shaft 164 and stops the shaft 164 when the protruding tab 463 contacts a stop 464 formed on the lower plate 452. In this manner, the windup shaft 164 may be turned a maximum of one full rotation. The wind-up shaft 164 is attached to one end of a coil spring 466 that is held in place on the upper plate 450. The other end of the coil spring 466 is crimped around a tab 468 extending from the upper plate 450.

The upper and lower plates 450, 452 form a gearbox 470 that provides a controlled resistance against the spring force of the coil spring 466 in the form of an escapement gear series. The coil spring 466 is wound up when the wind-up shaft 164 is turned via the dial knob 108. The coil spring 466 is released on a gradual basis through the escapement action of the gearbox 470, thereby turning the wind-up shaft 164 back to its original position.

The wind-up shaft 164 has a drive gear 472, which is mounted on the side of the upper plate 450 opposite the spring 466. The drive gear 472 meshes with a first sun gear 474, which is mounted on a first shaft 476 that is held between the upper and lower plates 450, 452. The first sun gear 474 is coupled to a first planet gear 478 that meshes with a second sun gear 480, which is mounted on a second shaft 482 that is held between the upper and lower plates 450, 452. In turn, the second sun gear 480 is coupled to a third planet gear 484, which meshes with a third sun gear 486 that is mounted on a third shaft 488, which is held between the upper and lower plates 450, 452. The third sun gear 486 is coupled to a planet gear 490 that meshes with a fourth sun gear 492, which is mounted on a fourth shaft 494 that is held between the upper and lower plates 450, 452. The fourth shaft 494 also includes a fourth planet gear 496 which is rotated with the fourth sun gear 492. The fourth planet gear 496 meshes with a fifth sun gear 498 that is mounted on a fifth shaft 500, which is held between the upper and lower plates 450, 452. The fifth sun gear 498 is coupled to a sprocket 502, which includes a circumferential series of notches 504 and teeth 505.

A rocker arm 506 is mounted to pivot with a sixth shaft 508. One end of the rocker arm 506 has a pair of pins 510, 511 that rest alternately in a notch 504 and on a tooth 505 of the sprocket 502. When the sprocket 502 rotates, the pins 510, 511 are moved alternately between contact with teeth 505 and notches 504, causing the rocker arm 506 to rockingly pivot back and forth with the sixth shaft 508. The opposite end of the rocker arm 506 includes a pair of gear teeth 512, with one on either side of with a flywheel pin 514. The pin 514 extends from a flywheel 516 which is mounted on a seventh shaft 518 between the upper and lower plates 450, 452. The shaft seventh 518 is attached to one end of a spiral spring 520. The other end of the spiral spring 520 is attached to a securing pin 522 on the lower plate 452. The spiral spring 520 provides a steady resistance to the movement of the flywheel 516. When the rocker arm 506 rockingly pivots back and forth as a result of force transmitted through the above-described gear series, the pair of gear teeth 512 bounce the flywheel pin 513 back and forth between them. This rhyhmically pivots the flywheel 516 back and forth, acting as a pendulum of the escapement formed by the gearbox 470. The steady resistance of the spiral spring 520 resists the movement of the flywheel 516 in a manner that keeps its pendulum movement substantially constant.

Thus, the series of gears and the resistance of the spring 520 permit the coil spring 466 to rotate the wind-up shaft 164 slowly to its original position at a constant rotational velocity. The time required to return to the original position is determined by the sun and planet gears and the rotational position that the wind-up shaft 164 is turned.

The timing mechanism 150 is relatively simple in operation, allowing decreased manufacturing and assembly costs. Further, the timing mechanism 150 is installed in-line with the components of the flow controller 100 to provide a compact internal design of the body 102. In alternative embodiments, the timer may be an electronic timer with a motor to turn the cam member, or some other timing mechanism.

It will be apparent to those skilled in the art that various modifications and variations can be made in the illustrated and described embodiments of the present invention without departing from the spirit or scope of the invention. It is therefore intended that the foregoing detailed description be regarded as illustrative rather than limiting, and that it be understood that it is the following claims, including all equivalents, that are intended to define the spirit and scope of this invention.

We claim:

1. An intermittent fluid flow controller comprising:
a main body including an inlet in controlled fluid communication with an outlet;
a mechanical timing mechanism including a rotatable member that rotates during an operation of the timing mechanism;
a first valve operated by the rotatable member and disposed in the main body such that a rotational movement of the rotatable member actuates the first valve to intermittently permit and restrict a fluid flow between the inlet and the outlet over a pre-selected period of time determined by the operation of the timing mechanism;
where the rotatable member comprises a substantially circular cam plate with a crenellated surface;
the crenellated surface comprises crenels and merlons; and
an operating connection between the rotatable member and the first valve comprises the crenellated surface.

2. The intermittent fluid flow controller of claim 1, wherein when the first valve contacts a crenel of the crenellated surface, the first valve is in an open configuration, said open configuration permitting a flow of fluid between the inlet and outlet; and
wherein when the first valve contacts a merlon of the crenellated surface, the valve is in a closed configuration, said closed configuration substantially restricting a flow of fluid between the inlet and outlet.

3. The intermittent fluid flow controller of claim 1, wherein when the first valve contacts a merlon of the crenellated surface, the first valve is in an open configuration, said open configuration permitting a flow of fluid between the inlet and outlet; and
wherein when the first valve contacts a crenel of the crenellated surface, the valve is in a closed configuration, said closed configuration substantially restricting a flow of fluid between the inlet and outlet.

4. The intermittent fluid flow controller of claim 1, wherein the first valve is a stem valve including a plunger shaft, wherein the operating connection comprises a contact between the crenellated surface and the plunger shaft.

5. The intermittent fluid flow controller of claim 1, wherein the first valve is a stem valve including a plunger shaft, the plunger shaft being contacted by the rotatable member.

6. The intermittent fluid flow controller of claim 1, further comprising a second valve disposed in the body and operatively connected with the first valve such that an operative state of the second valve depends upon an operative state of the first valve and upon a fluid pressure from the inlet.

7. The intermittent fluid flow controller of claim 1, comprising a first controlled path of fluid communication through an upper portion of the body between the inlet and the outlet, and a second controlled path of fluid communication through a lower portion of the body between the inlet and the outlet.

8. The intermittent fluid flow controller of claim 7, further comprising a second valve disposed in the body.

9. The intermittent fluid flow controller of claim 8, wherein when the first and second valves are in a closed operative state,
the second valve substantially restricts the first path of fluid communication; and
the first and second valves substantially separate the first path of fluid communication from the second path of fluid communication.

10. The intermittent fluid flow controller of claim 8, wherein an operative state of the second valve depends upon an operative state of the first valve and a fluid pressure from the inlet such that when a fluid pressure from the inlet is present and the first valve is in a closed operative state, the second valve assumes a closed operative state; and
wherein when a fluid pressure from the inlet is present and the first valve is in an open operative state, the second valve assumes an open operative state.

11. The intermittent fluid flow controller of claim 10, wherein when the first and second valves are in a closed operative state,
the second valve substantially restricts the first path of fluid communication; and
the first and second valves substantially separate the first path of fluid communication from the second path of fluid communication.

12. A timer flow controller for controlling a flow of water, the flow controller comprising:
a main body having an inlet and outlet for passage of water through the flow controller;
a first valve between the inlet and outlet, the first valve including a plunger shaft for actuation of the first valve;
a rotatable timing mechanism in operative contact with the plunger shaft, such that the timing mechanism can be set to rotate for a predetermined amount of time and that as the timing mechanism rotates, the plunger shaft is moved to actuate the first valve between an open configuration and a closed configuration for a series of intermittent time periods over the pre-selected period of time;
an outlet lumen coupled in fluid communication with the outlet and an inlet lumen fluidly coupled in fluid communication with the inlet;
the inlet lumen being in controlled fluid communication with the outlet lumen, said controlled fluid communication being controlled by the first valve and a second valve.

13. The flow controller of claim 12, further comprising:
a first valve chamber separated from a second valve chamber by a divider allowing fluid communication therebetween;
a diaphragm of the second valve separating the inlet lumen and the outlet lumen from the first valve chamber;
wherein, when the flow controller is in a closed operative state, the second valve prevents fluid passage from the inlet lumen to the outlet lumen; and,
wherein, when the flow controller is in a closed operative state, the first valve is in the closed configuration and prevents fluid communication from the second valve chamber to the outlet lumen.

14. The flow controller of claim 13 wherein the diaphragm includes at least one small hole therethrough to allow a substantially limited water flow from the inlet lumen to the first valve chamber.

15. The flow controller of claim 12 further comprising a dial knob;
the dial knob comprising a first crenellated cam member in contact with one end of the plunger shaft, such that a rotational movement of the first crenellated cam member actuates the first valve by moving the plunger shaft.

16. The flow controller of claim 15 wherein the dial knob is operably connected to the timing mechanism and may be rotated to set the timing mechanism to wind down over the pre-selected period of time.

17. The flow controller of claim 15 wherein the operative contact comprises a contact between a pattern of crenels and merlons of the crenellated cam member and the plunger shaft of the first valve.

18. The flow controller of claim 17,
wherein when the plunger shaft of the first valve engages a crenel, the first valve is in an open position and
when the plunger shaft of the first valve engages a merlon, the first valve is in a closed position.

19. The flow controller of claim 17,
wherein when the plunger shaft of the first valve engages a merlon, the first valve is in an open position and
when the plunger of the first valve engages a crenel, the first valve is in a closed position.

20. The flow controller of claim 15, further comprising a second crenellated cam member, wherein the second crenellated cam member is interchangeable with the first crenellated cam member.

21. The flow controller of claim 15, further comprising a second crenellated cam member, wherein the second crenellated cam member is annularly, adjustably positioned relative to the first crenellated cam member.

22. The flow controller of claim 15 wherein fluid communication is open between the inlet and the outlet when the first valve is in an open position; and fluid communication is substantially blocked between the inlet and the outlet when the stem valve is in a closed position.

23. A intermittent timing flow controller comprising:
an inlet adapted for being coupled to a source of pressurized water flow;
an outlet;
a valve housing providing fluid communication between the inlet and the outlet, and controlling water flow between the inlet and the outlet;
a first valve substantially within the valve housing and including a plunger shaft substantially perpendicular to the inlet and outlet;
a second valve substantially within the valve housing and including a diaphragm that includes an open position and a closed position, said open position allowing water flow from the inlet to the outlet and said closed position preventing water flow from the inlet to the outlet;
a dial knob comprising a cam member with an irregular surface;
the dial knob being rotatable about an axis of the valve housing of the flow controller;
a timing mechanism comprising a windup shaft, the windup shaft including one end coupled to the dial knob;
the plunger shaft having a first end which is in interactive contact with the irregular surface of the cam such that when the first end contacts a first portion of the irregular surface, the first valve is in a closed configuration, and when the first end contacts a second portion of the irregular surface the first valve is in an open configuration;
the first valve being functionally coupled to the second valve such that when a flow of water is present through the inlet and the first valve is in an open configuration, the second valve is in the open position.

* * * * *